United States Patent
Daugherty et al.

(10) Patent No.: US 9,759,355 B2
(45) Date of Patent: Sep. 12, 2017

(54) FLUID HANDLING ASSEMBLY HAVING A MULTILAYERED COMPOSITE PIPE EMPLOYING A MECHANICAL COUPLING AND METHOD OF ASSEMBLING THE FLUID HANDLING ASSEMBLY

(75) Inventors: Kevin B. Daugherty, Fairlawn, OH (US); Kevin M. Sillasen, Valley City, OH (US)

(73) Assignee: Lubrizol Advanced Maaterials, Inc., Cleveland, OH (US)

( * ) Notice: Subject to any disclaimer, the term of this patent is extended or adjusted under 35 U.S.C. 154(b) by 1130 days.

(21) Appl. No.: 13/991,539

(22) PCT Filed: Dec. 8, 2011

(86) PCT No.: PCT/US2011/063908
§ 371 (c)(1),
(2), (4) Date: Aug. 19, 2013

(87) PCT Pub. No.: WO2012/078842
PCT Pub. Date: Jun. 14, 2012

(65) Prior Publication Data
US 2013/0319568 A1 Dec. 5, 2013

Related U.S. Application Data

(60) Provisional application No. 61/421,260, filed on Dec. 9, 2010.

(51) Int. Cl.
*F16L 39/00* (2006.01)
*F16L 9/147* (2006.01)
(Continued)

(52) U.S. Cl.
CPC ............... *F16L 9/147* (2013.01); *B32B 1/08* (2013.01); *B32B 15/08* (2013.01); *B32B 15/20* (2013.01);
(Continued)

(58) Field of Classification Search
CPC ........... F16L 9/14; F16L 9/147; F16L 13/103; F16L 23/08
(Continued)

(56) References Cited

U.S. PATENT DOCUMENTS 3,054,629 A * 9/1962 Piatek ..................... F16L 17/04
285/373
3,866,633 A 2/1975 Taylor
(Continued)

FOREIGN PATENT DOCUMENTS

WO 9961833 12/1999
WO WO 99/61833 12/1999
(Continued)

OTHER PUBLICATIONS

Written Opinion of Corresponding International Application No. PCT/US2011/063908 dated Dec. 28, 2011.
(Continued)

*Primary Examiner* — Gregory Binda
(74) *Attorney, Agent, or Firm* — Christopher P. Demas; Teresan W. Gilbert

(57) ABSTRACT

A fluid handling assembly includes a first pipe. The first pipe includes an inner layer made of a CPVC composition, an intermediate layer made of a metal at least partially surrounding the inner layer, and an outer layer made of a CPVC composition at least partially surrounding the intermediate layer. A first tubular coupling bushing has a first portion and a second portion. The first portion is coupled to the first pipe. The second portion has an engaging portion that is configured to engage to a mechanical fixture that sealingly engages the first pipe and a second pipe. A method of making the fluid handling assembly is also disclosed.

6 Claims, 8 Drawing Sheets

(51) Int. Cl.
*F16L 13/10* (2006.01)
*F16L 23/08* (2006.01)
*F16L 17/04* (2006.01)
*B32B 15/08* (2006.01)
*B32B 15/20* (2006.01)
*B32B 27/30* (2006.01)
*B32B 1/08* (2006.01)

(52) U.S. Cl.
CPC .......... *B32B 27/304* (2013.01); *F16L 13/103* (2013.01); *F16L 17/04* (2013.01); *F16L 23/08* (2013.01); *B32B 2597/00* (2013.01); *Y10T 29/49428* (2015.01)

(58) Field of Classification Search
USPC .................. 285/222.1, 22.4, 296.1, 915, 919
See application file for complete search history.

(56) References Cited

U.S. PATENT DOCUMENTS

| | | | | |
|---|---|---|---|---|
| 4,000,920 A | * | 1/1977 | Horvath | F16L 33/01 285/222.4 |
| 5,207,460 A | * | 5/1993 | Oetiker | F16L 33/20 285/256 |
| 6,293,311 B1 | * | 9/2001 | Bushi | B29C 47/0023 138/138 |
| 7,086,131 B2 | * | 8/2006 | Gibb | F16L 23/08 |
| 2009/0309353 A1 | * | 12/2009 | Linhart | A47L 9/24 285/7 |
| 2010/0263884 A1 | * | 10/2010 | Perkovich | F16L 23/08 |
| 2014/0144538 A1 | * | 5/2014 | Sillasen | F16L 9/147 |

FOREIGN PATENT DOCUMENTS

| | | |
|---|---|---|
| WO | 0133132 | 5/2001 |
| WO | WO 01/33132 | 5/2001 |
| WO | 2007126892 | 11/2007 |
| WO | WO 2007/126892 | 11/2007 |

OTHER PUBLICATIONS

Corresponding International Publication No. WO 2012/078842 A1 published Jun. 16, 2012.

* cited by examiner

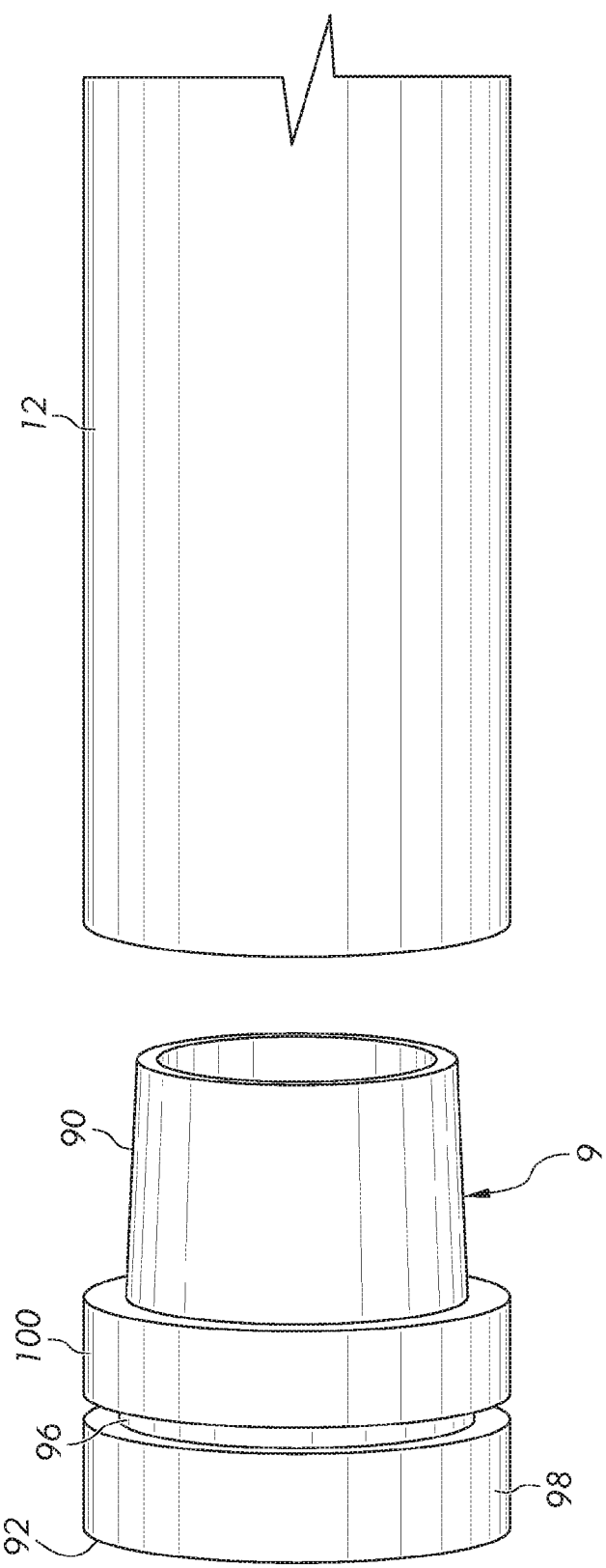

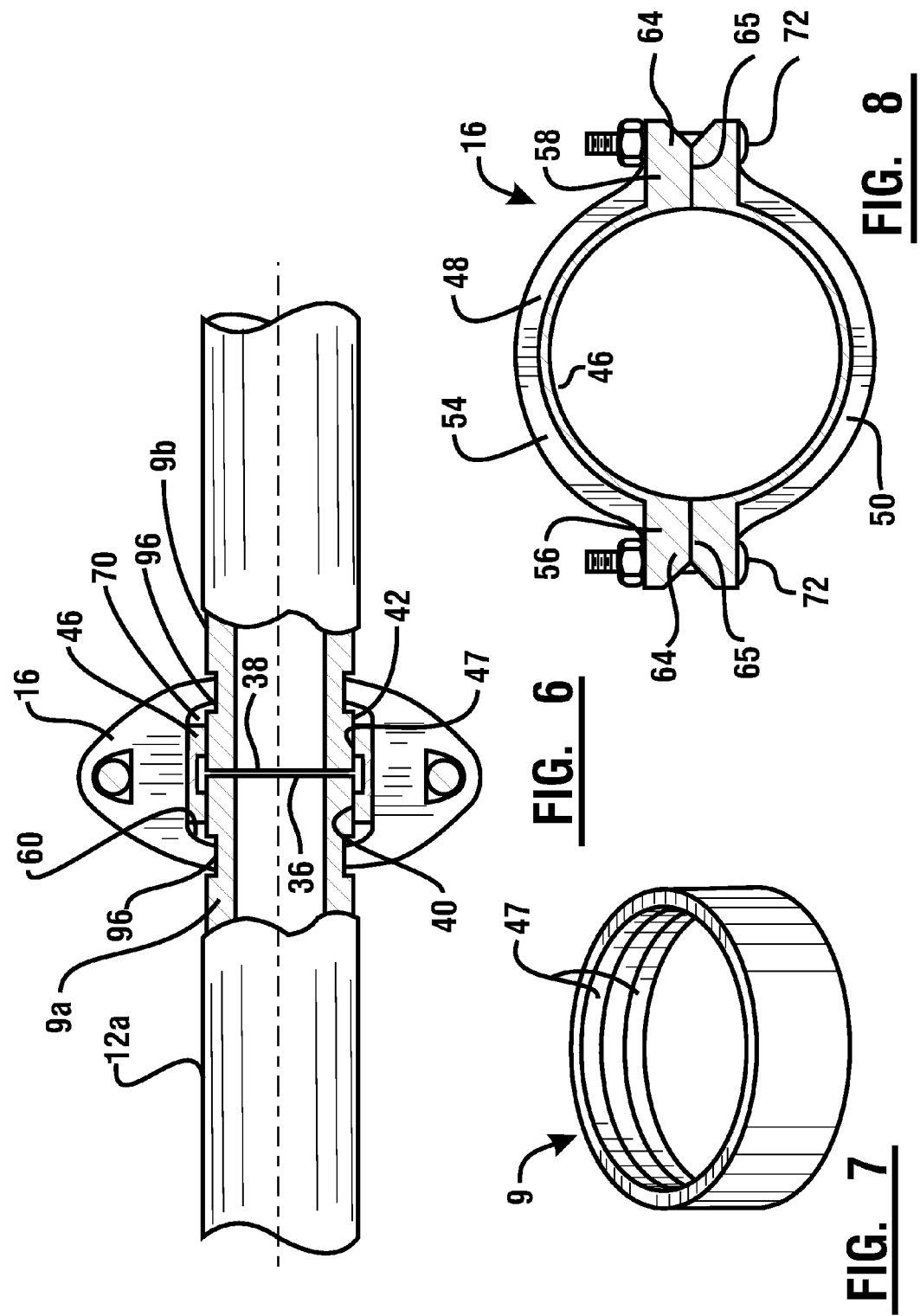

FLUID HANDLING ASSEMBLY HAVING A MULTILAYERED COMPOSITE PIPE EMPLOYING A MECHANICAL COUPLING AND METHOD OF ASSEMBLING THE FLUID HANDLING ASSEMBLY

TECHNICAL FIELD

The invention relates generally to a fluid handling assembly comprising a multilayered composite pipe and method of assembling the fluid handling assembly. An exemplary embodiment provides for a coupling bushing coupled to the pipe and that the coupling bushing is configured to engage to a mechanical fixture that sealingly engages the pipe to another pipe.

BACKGROUND

Many buildings are required by code to have fire suppression sprinkler systems. Further, residential structures are increasingly being provided with fire suppression systems. CPVC piping systems are ideally suited for fire sprinkler system applications because of their resistance to corrosion, the lightness of material, ease of installation, and other desirable properties. Additionally, many buildings and offshore applications include drainage, waste, and ventilation (DWV) systems, which can be utilized in connection with transporting/treating possibly toxic chemicals. CPVC piping systems, due at least in part to resistivity to fire and smoke are well suited for these applications.

Under current standards, in-line coupling of abutting CPVC pipe sections is accomplished by use of solvent cement techniques to form a permanent bond therebetween. Such techniques require sufficient time for the solvent cement to cure. Furthermore, at times it may become necessary to make modifications or repairs to existing CPVC piping systems. The use of solvent cement demands that the modification to the pipe network be accomplished in a generally dry environment.

In use, many piping systems, including fire systems and DWV systems, may be under continuous water pressure or varying water pressure. In prior CPVC piping systems, for a system modification or repair, the pipe section must be removed from service and drained. The new CPVC pipe sections must be connected into the system adhered by solvent cement which requires an applicable cure time. Thereafter, the system is brought back online and tested. During this process, which may extend over 24 hours or longer, at least a portion of the piping system is out of service, requiring, for instance, an alternate fire watch or a DWV system to be temporarily unavailable. Use of the solvent cement creates an irreversible pipe connection. Thus, misalignment or other adverse conditions cannot be readily corrected. Further, some piping systems, such as piping used in some food preparation systems, require frequent disassembly for cleaning.

One solution to this problem is to utilize a mechanical coupling that sealingly engages annular grooves rolled or cut into the two pipes to fasten them together. This avoids the use of solvent cement.

However, CPVC pipes are more flexible than metal pipes and therefore need more support. The additional support adds to the installation time and also the material costs due to the additional material of the entire system. Therefore, it is often desirable to use multilayered composite pipes that comprise a metal layer sandwiched between inner and outer layers of CPVC to provide the necessary support while still providing many of the advantages of CPVC pipes.

Yet, the method of cutting or rolling grooves into CPVC pipes is not desirable for use on the above-mentioned multilayered composite pipes. In rolled grooving, material is pressed inwardly to form a circumferential depression on the outer surface. The method of cutting a groove involves having pipe wall material removed by a blade or other cutting implement. Either cutting or rolling a groove in these multilayer composite pipes would break or delaminate the outer layer and possibly the inner layer as well.

Thus, there exists a need to provide a method to join multilayered composite pipes which eliminates the down time associated with prior joining processes yet will maintain the integrity of the pipe.

There also exists a need in the art for a fluid handling assembly comprising multilayer composite pipes and couplings that couple the pipes together without the use of solvent cement to couple the couplings together.

There further exists a need in the art for cut-in fittings and procedures that significantly reduce downtime of the sprinkler system, while still providing a system that meets stringent fire protection standards.

If mechanical couplings and fittings are to be used with CPVC pipe systems, such items should be utilized in ways that accommodate the properties of the CPVC piping. Compression and support requirements of the CPVC material should also be met. Thus, there exists a need for mechanical fixtures that are compatible with the properties of the CPVC material in the pipes.

There also exists a need to connect non-composite plastic pipe to composite plastic pipe or to another length or non-composite plastic pipe with a mechanical coupling device, without the requirement of forming a groove in the plastic pipe.

Further, certain fire testing standards have been developed that are specific to plastic piping systems. Incorporation of mechanical fittings and adapters into such systems requires that the hybrid system meet certain performance standards. Thus, there exists a need for a plastic/mechanical system to perform in accordance with accepted fire standards.

There also exists a need to connect a plastic pipe, either composite or non-composite with a metal pipe, without the requirement of forming a groove in the plastic pipe.

The above described needs can be accomplished by using a coupling bushing as described herein.

ASPECTS OF EXEMPLARY EMBODIMENTS

In an exemplary embodiment, a fluid handling assembly comprises a first pipe. The first pipe comprises an inner layer comprising a CPVC composition, an intermediate layer comprises a metal at least partially surrounding the inner layer, and an outer layer comprising a CPVC composition at least partially surrounding the intermediate layer. Preferably, the intermediate metal layer completely surrounds the inner CPVC layer, and the outer CPVC layer completely surrounds the intermediate metal layer. A first tubular coupling bushing has a first portion and a second portion. The first portion is coupled to the first pipe. The second portion has an engaging portion that is configured to engage to a mechanical fixture that sealingly engages the first pipe to a second pipe.

In another aspect of the exemplary embodiment, a method for making a fluid handling assembly comprises the steps of forming a first pipe. Forming the first pipe comprises the steps of forming a metal tubular member; forming an inner layer comprised of a CPVC composition on the inner side of the tubular member; and forming an outer layer comprised of a CPVC composition on the outer side of the tubular member. The method further comprises the steps of forming a first tubular coupling bushing; coupling a first portion of the first tubular coupling to the first pipe; forming a second pipe, providing a mechanical fixture; and engaging a second portion of the first tubular coupling to a mechanical fixture to sealingly engage the first pipe to the second pipe.

These, as well as other aspects of exemplary embodiments will become apparent upon a consideration of the following detailed description, drawings, and appended claims.

BRIEF DESCRIPTION OF THE DRAWINGS

The foregoing summary, as well as the following detailed description of exemplary embodiments, will be better understood when read in conjunction with the appended drawings. For the purpose of illustrating the invention, there is shown in the drawings certain exemplary embodiments. It should be understood, however, that the invention is not limited to the precise arrangements and instrumentalities shown. In the drawings:

FIG. 4A is an exploded view showing a multilayer composite pipe and the insert coupling bushing;

FIG. 6 is a front view, partly in section, of a pair of multilayer composite pipes joined end-to-end via a mechanical fixture;

FIG. 7 is a perspective view of a seal member for use in the mechanical fixture;

FIG. 8 is a side view of an insert and the mechanical fixture assembly; and

DETAILED DESCRIPTION OF EXEMPLARY EMBODIMENTS

Figure 1:
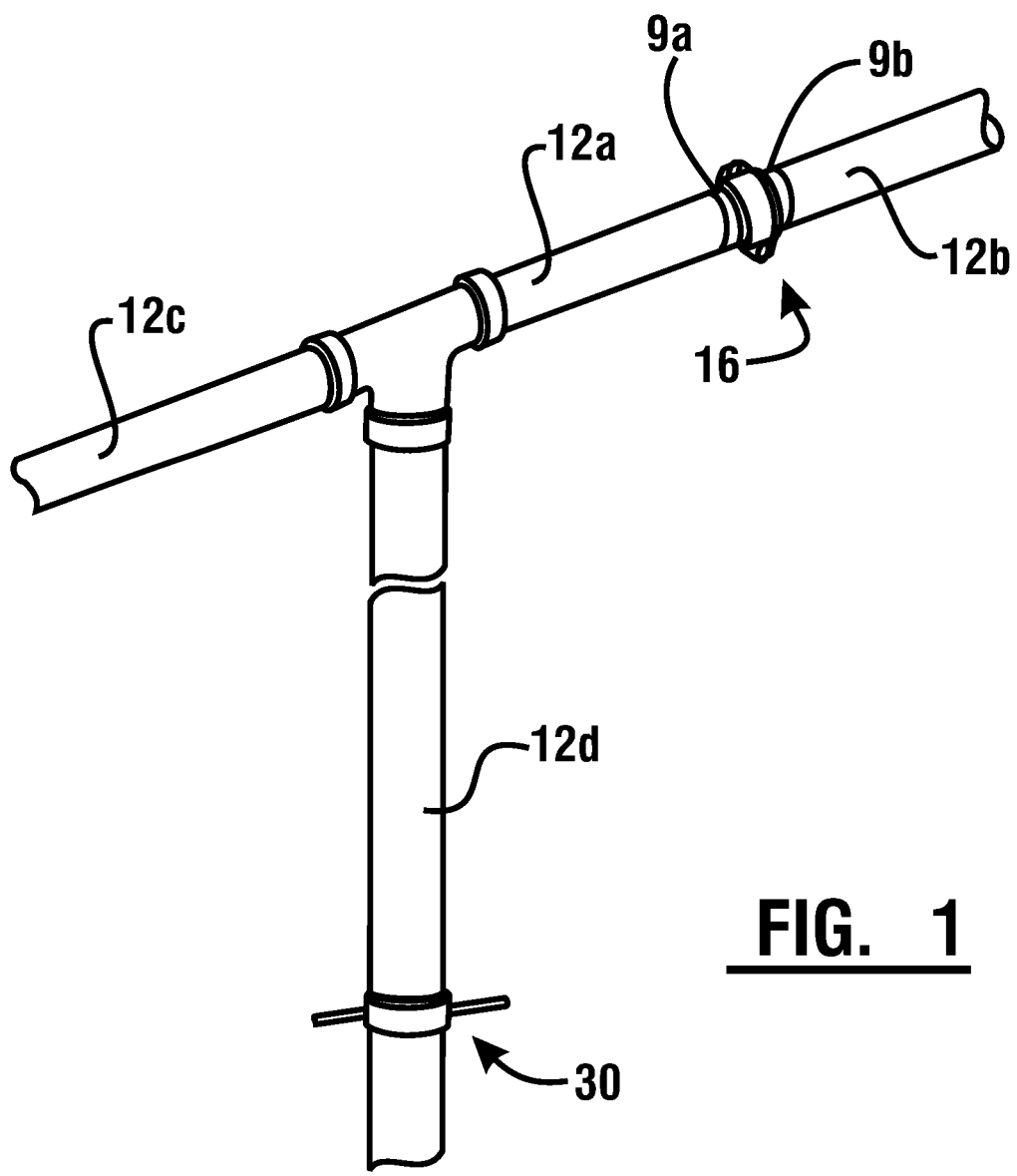
FIG. 1 is a schematic representation of an exemplary fire sprinkler system comprising a fluid handling assembly comprising multilayer composite pipes, fittings, and mechanical fixtures.
Figure 2:
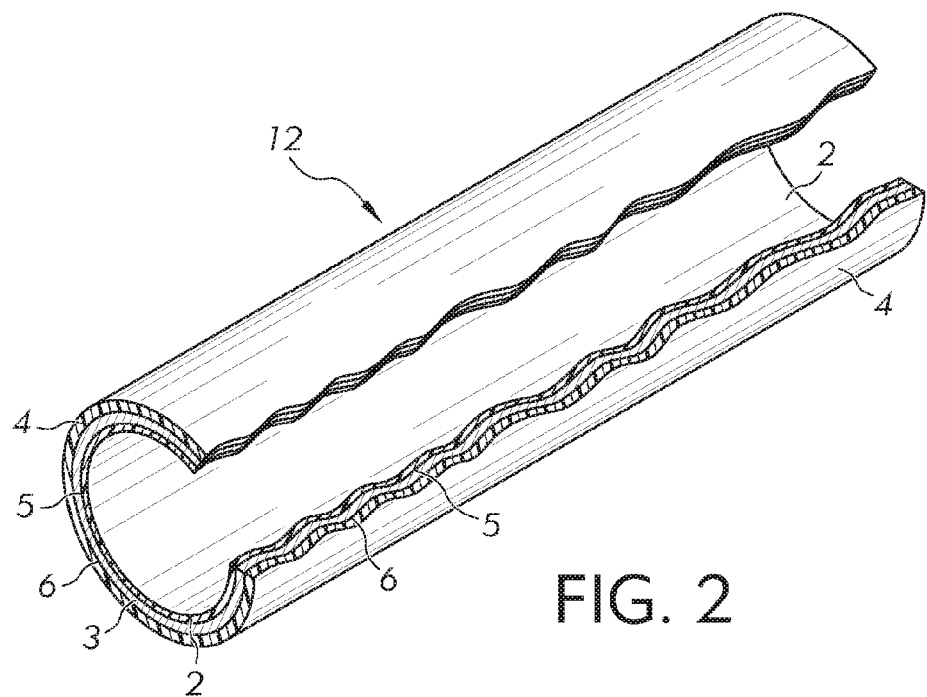
FIG. 2 is a sectional view of a multilayer composite pipe of the fluid handling assembly of the exemplary embodiment.
Figure 2A:
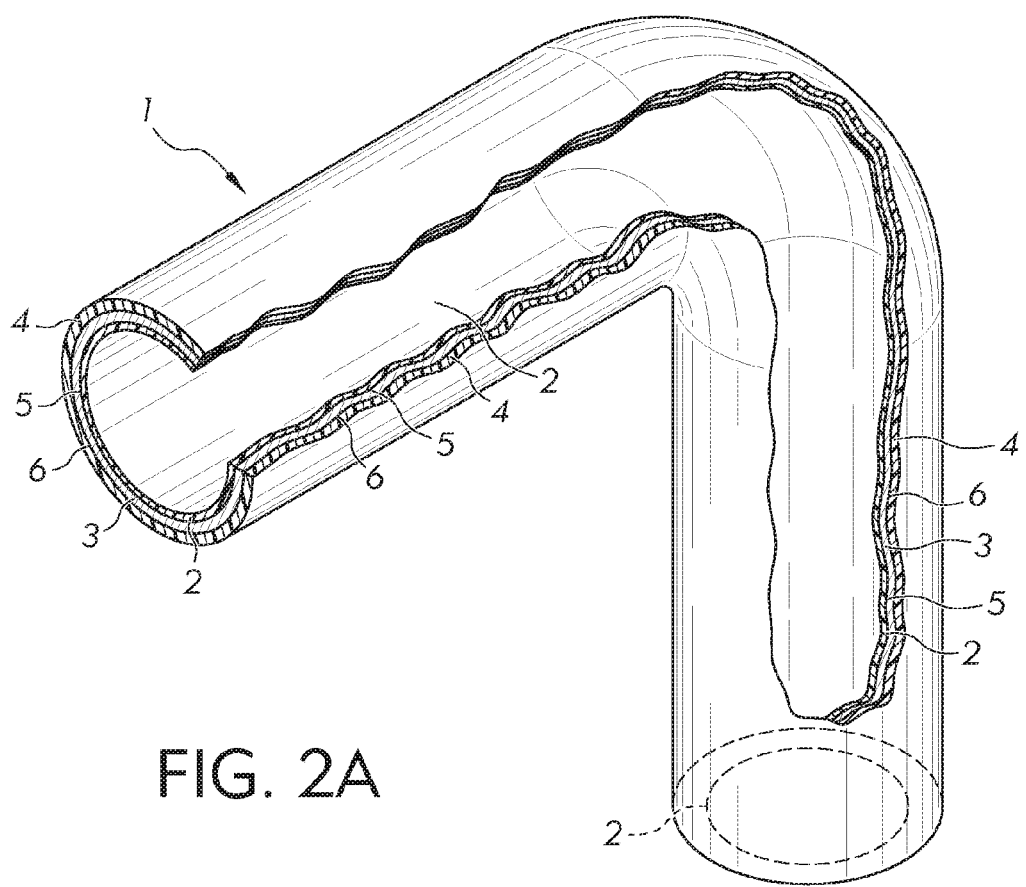
FIG. 2A is a sectional view of a multilayer composite pipe of the fluid handling assembly of the exemplary embodiment which is bent.
Figure 4:
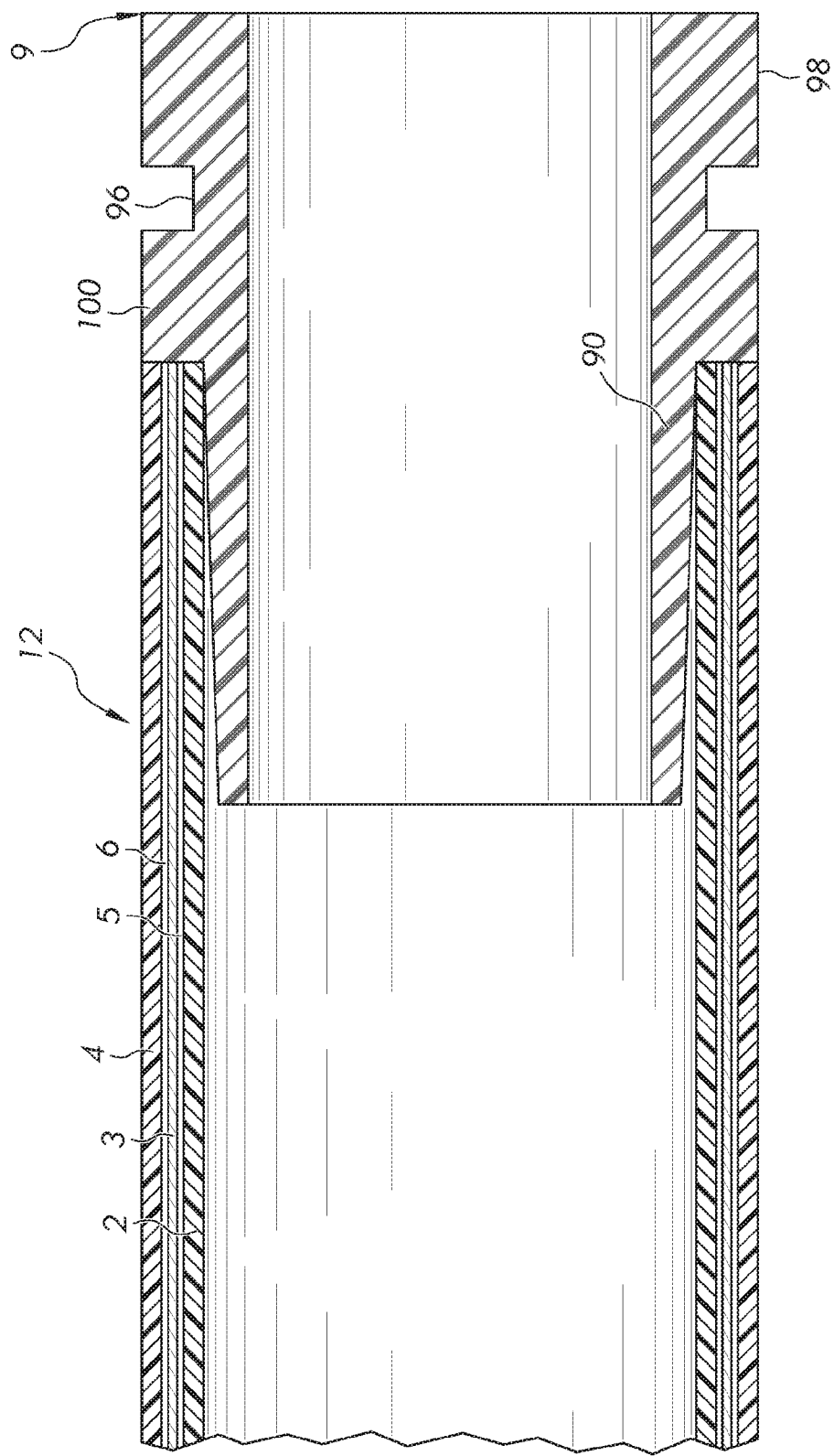
FIG. 4 is a cross sectional view of the insert coupling bushing and the multilayer composite pipe as joined together.

With respect to FIG. 1, in an exemplary embodiment, a portion of fire sprinkler system, generally indicated 10 includes a network of multilayer composite pipe lengths 12a, 12b, 12c, and 12d. As seen in FIGS. 2, 2A, and 4, each multilayer composite pipe 12 comprises an inner layer 2 formed into a hollow conduit, a metallic intermediate layer 3, which surrounds the inner layer 2, and an outer layer 4 composed of an amorphous thermoplastic polymer surrounding the metallic intermediate layer 3. An adhesive layer 5 is placed between the outer surface of the inner layer 2 and the inner surfaces of the metallic intermediate layer 3, as well as, a second adhesive layer 6 between the outer surface of the metallic intermediate layer 3 and the inner surface of the outer layer 4.

The hollow inner conduit is formed by a hollow length of a pipe having a completely closed tubular outer surface and an opposing closed tubular inner surface. The hollow inner conduit can be made either from a rigid semi-crystalline thermoplastic plastic or a rigid amorphous thermoplastic.

A rigid amorphous thermoplastic material is a thermoplastic material which can be stretched beyond its yield point. A rigid amorphous thermoplastic as used herein is a thermoplastic material having a modulus of elasticity, either in flexure or in tension, greater than 300,000 psi at 23° C. and 50% relative humidity when tested in accordance with ASTM Test Methods D790, D638, or D882. Generally, amorphous polymers have less than fifteen percent crystallinity. Further information on amorphous thermoplastic polymers can be found in Alfrey, Jr., Mechanical Behavior of High Polymers, John Wiley & Sons, Inc., (New York, 1965), pp. 510-515.

Examples of some suitable amorphous thermoplastics which can be used to form the first layers as defined herein include chlorinated polyvinyl chloride ("CPVC"), polyvinyl chloride ("PVC"), polyvinylidene fluoride ("PVDF"), polyether sulfone and polyphenyl sulfide, polycarbonate, acrylics such as methyl methacrylate, and styrenics such as acrylonitrile styrene butadiene polymers ("ABS"). The most preferred amorphous thermoplastic is CPVC.

An exemplary type of CPVC resin is sold under the BLAZEMASTER® brand name. An exemplary CPVC composition has physical and thermal characteristics as follows:

| Property | BLAZEMASTER® Brand CPVC | ASTM |
|---|---|---|
| Specific Gravity, "Sp. Gr." | 1.55 | D792 |
| IZOD Impact Strength (ft. lbs./inch notched) | 1.5 | D256A |
| Modulus of Elasticity, @73° F. psi, "E" | 4.23 × 10$^5$ | D638 |
| Compressive Strength, psi, "o" | 9,600 | D695 |
| Poisson's Ratio, "O" | .35-.38 | — |
| Working Stress @ 73° F., psi, "S" | 2,000 | D1598 |
| Hazen Williams Factor "C" | 150 | — |
| Coefficient of Linear Expansion, in/(in ° F.), "e" | 3.4 × 10$^{-5}$ | D696 |
| Thermal Conductivity, BTU/hr/ft$^2$/° F./in, "k" | 0.95 | D177 |
| Flash Ignition Temperature, ° F. | 900 | D1929 |
| Limiting Oxygen Index, "LOI" % | 60 | D2863 |
| Electrical Conductivity | Non Conductor | — |
| Extrusion Temperature | 414-425° F. (approx.) | N/A |
| Heat Distortion Temperature, ° F. | 217 | — |

While the system 10 of FIG. 1 is shown as being a fire sprinkler system, it is to be understood that aspects described herein can conform to other types of piping systems, including various water distribution systems, industrial systems including drain, waste, and ventilation (DWV) systems, amongst other systems. For example, another exemplary CPVC resin that can be utilized in connection with aspects described herein is sold under the FLOWGUARD® brand name. Another exemplary CPVC composition has physical and thermal characteristics as follows:

| Property | FLOWGUARD® Brand CPVC | ASTM |
|---|---|---|
| Specific Gravity, "Sp. Gr." | 1.55 | D792 |
| IZOD Impact Strength (ft. lbs./inch notched) | 10 | D256A |
| Modulus of Elasticity, @73° F. psi, "E" | $4.23 \times 10^5$ | D638 |
| Ultimate Tensile Strength, psi | 8,400 | D638 |
| Compressive Strength, psi, "o" | 9,600 | D695 |
| Hazen Williams Factor "C" | 150 | — |
| Coefficient of Linear Expansion, in/(in ° F.), "e" | $3.8 \times 10^{-5}$ | D696 |
| Thermal Conductivity, BTU/hr/ft²/° F./in, "k" | 0.95 | D177 |
| Limiting Oxygen Index, "LOI" % | 60 | D2863 |
| Electrical Conductivity | Non Conductor | — |

Another exemplary CPVC resin can be sold under the CORZAN® brand name. This exemplary CPVC resin has physical and thermal properties as follows:

| Property | CORZAN® Brand CPVC | ASTM |
|---|---|---|
| Specific Gravity, "Sp. Gr." | 1.52 | D792 |
| Modulus of Elasticity, @73° F. psi, "E" | $4.23 \times 10^5$ | D638 |
| Tensile Strength at Yield, psi | 7,320 | D638 |
| Compressive Strength, psi, "o" | 10,100 | D695 |
| Poisson's Ratio, "O" | .35-.38 | — |
| Working Stress @ 73° F., psi, "S" | 2,000 | D1598 |
| Hazen Williams Factor "C" | 150 | — |
| Coefficient of Linear Expansion, in/(in ° F.), "e" | $3.8 \times 10^{-5}$ | D696 |
| Thermal Conductivity, BTU/hr/ft²/° F./in, "k" | 0.95 | D177 |
| Limiting Oxygen Index, "LOI" % | 60 | D2863 |
| Electrical Conductivity | Non Conductor | — |

BlazeMaster®, FlowGuard®, and Corzan® are registered trademarks of The Lubrizol Corporation and these CPVC materials are available from The Lubrizol Corporation, Wickliffe, Ohio, U.S.A.

Generally, the thickness of the inner hollow conduit will be dependent upon the desired final thickness of the thermoplastic composite pipe. Preferably, the outer diameter of inner hollow conduit should be greater than the bore of the pipe by at least 0.1 mm. The most preferred amorphous thermoplastic used to form the hollow inner conduit is CPVC. In one embodiment, the CPVC is one to two times as thick as the metallic intermediate layer. In the most preferred embodiment, the CPVC layer is 1.5 times as thick as the metallic intermediate layer. In the most preferred embodiment, the CPVC forming the hollow inner conduit has a thickness of approximately 0.6 mm. The hollow inner conduit is preferably formed by an extrusion process although any other process may be used to form the hollow conduit.

The first adhesive layer used between the outer surface of the inner layer 2 and the inner surface of the metallic intermediate layer 3 is any suitable bonding agent that can be used to permanently bond the thermoplastic polymer forming the inner hollow conduit to the metallic intermediate layer 3. The adhesive is preferred since the thermoplastic material of the inner hollow conduit itself will not bond to the metallic inner layer. Preferably, the bonding agent can adapt to different coefficients of thermal expansion due to the differences in the materials between the two layers. The adhesive can be sprayed, extruded, brushed or applied in any manner to the outer surface of the inner hollow conduit. If the adhesive is sprayed, the adhesive can be diluted if so recommended by the manufacturer. The first adhesive is preferably applied to the entire outer surface of the inner layers. Alternatively, the first adhesive layer can be applied as a series of rings evenly spaced around the outer surface of the inner layers. Generally, the first adhesive is applied to yield a layer having a thickness of about 0.01 mm to about 0.5 mm. The preferred thickness of the first adhesive layer is about 0.1 mm. The most preferred method to apply the adhesive is to coat both sides of the metallic intermediate layer 3 with the adhesive prior to the metallic layer 3 contacting inner CPVC layer 2 or outer CPVC layer 4.

The first adhesive can be any suitable adhesive material. Examples of suitable adhesives include polyvinyl chloride and polyvinyl chloride copolymers, polyurethanes or other isocyanide based polymers, chloroprene and its copolymers, epoxides, acrylates, polyethylene copolymers. If polyethylene copolymers are used, it is preferred that the comonomer is a vinyl acetate or maleic anhydride. The preferred adhesive layer when used in conjunction with a CPVC inner hollow conduit is an adhesive applied to both sides of the metallic layer. The preferred adhesive is commercially available from Mercural Corp. of Colmar, France and is known as CIRE-10B. The adhesive is believed to be a bilayer adhesive selected from (i) a thermosetting epoxy with a high molecular weight polyester adhesive for a primer layer, and a heat-activatable, crosslinkable polyurethane top coat, (ii) an acetophenone-formaldehyde resin, optionally modified with epoxy, and (iii) an anti-corrosion primer based on an epoxy-modified high molecular weight copolyester-urethane polymer along with a top coat based on a high molecular weight crosslinked copolyester-urethane polymer. The bilayer adhesive on the metallic layer is dried to form a solvent free dry adhesive before being used in the construction of the composite pipe.

The intermediate layer 3 of the multilayer composite pipe can be formed from any suitable metallic material, provided that it has a tensile strength that is greater than the tensile strength of the plastic. Examples of suitable metallic intermediate layers include ferrous materials, copper, stainless steel, brass, and aluminum materials. In addition, alloys can be used so long as they provide support to the thermoplastic materials used to form the inner and the outer layers of the composite pipe structure.

The metallic intermediate layer 3 is preferably made from a smooth metallic material. Generally, the thickness of the metallic intermediate layer should be in the range of 0.05-10 mm. Preferably, the thickness can be in the range of 0.1 to 4.0 mm and with a thickness of about 0.3 to about 1.5 mm being more preferable. The thickness of about 0.4 mm is the most preferred thickness for an aluminum intermediate layer. For a steel intermediate metallic layer, the most preferred thickness is about 1.0 mm. The metallic intermediate layer can be in the form of a conduit with open ends which surrounds the inner hollow conduit. Alternatively, as described below in further detail, the metallic intermediate layer can be formed from metal sheeting wrapped around the inner hollow conduit. The sheeting material can be joined together by a method such as welding. When it is desired to make a pipe which is bendable, the most preferred material used as the metallic intermediate layer is aluminum. For non-bendable pipe, such as fire sprinkler pipe, steel is the preferred metal used. If the metallic layer is not welded, it must be overlapped when placed around the inner layer 2. The metallic intermediate layer can overlap due to wrapping of the metal at an angle or just plain overlapping of the metal in which opposing sides of the material abut each other. Preferably, when aluminum is used, the thickness is in the range of 0.5 to 5.0% of the outer diameter of the multi-layer composite pipe. In the most preferred embodiment, the aluminum layer is about 0.4 mm thick, and the steel layer is about 1.0 mm thick.

A second adhesive layer is used in the multilayer composite pipe and is placed on the outer surface of the intermediate metal layer 3. This adhesive used in the intermediate layer can be any suitable bonding agent that can be used to permanently bond the outer surface of the metallic intermediate layer to the inner surface of the outer thermoplastic layer 4. Preferably, the bonding agent can adapt to different coefficients of thermal expansion due to the differences in the materials between the two layers. The adhesive can be sprayed, brushed, extruded, or applied in any manner to the surface. The adhesive can be applied to the entire outer surface of the intermediate layer 3. Alternatively, the adhesive layer can be applied as a series of rings evenly spaced around the outer surface of a second material. The adhesive is applied generally to a thickness of about 0.01 to about 0.5 mm, preferably, 0.1 mm. The most preferred method is to apply the adhesive to both sides of the metal layer as described above for the first adhesive layer.

This second layer of adhesive is preferably the same as the first layer of the adhesive used between the outer surface of the inner hollow conduit and the inner surface of the intermediate layer. Alternatively, the adhesive can also be different so long as a bond is established between the outer surface of the metallic intermediate layer and inner surface of the outer layer. Examples of suitable adhesives include polyvinyl chloride and polyvinyl chloride copolymers, polyurethanes or other isocyanide based polymers, chloroprene and its copolymers, epoxides, and acrylates. The preferred adhesive layer when the outer layer is chlorinated polyvinyl chloride is the CIRE-10B from Mercural Corp. as described above for the first adhesive layer. The methods of application as well as the thickness used for this second adhesive layer are as described above with respect to the first adhesive layer.

The outer layer of the multilayer composite pipe is formed from a rigid plastic, as defined above. Preferably, the outer layer is made from a rigid plastic which is an amorphous thermoplastic polymer. Suitable amorphous thermoplastics which can be used to form the outer layer of the multilayer composite pipe as defined herein include chlorinated polyvinyl chloride ("CPVC"), polyvinyl chloride ("PVC"), polyvinylidene fluoride ("PVDF"), polyether sulfone and polyvinylidene sulfide, polycarbonate, acrylics such as methyl methacrylate, and styrenics such as acrylonitrile styrene butadiene ("ABS"). In one exemplary embodiment, the outer layer of the multilayer composite pipe can be made from the same material as the inner hollow conduit. Alternatively, in some embodiments the outer layer can be made from a different amorphous thermoplastic material than the inner layer forming the hollow conduit if the inner layer is made from an amorphous thermoplastic material. However, care must be taken in choosing the materials to ensure that the multilayer composite pipes can be joined together to form a composite system. Generally, the thickness of the outer layer will be dependent upon the desired final thickness of the multilayer composite pipe. Preferably, the outer layer will have a thickness as compared to the metallic intermediate layer in the range of 1:5 to 5:1. Preferably, thickness of the outer layer when compared to the metallic intermediate layer is in the ratio of 1:3 to 3:1. In the most preferred embodiment of the multilayer composite pipe, the outer layer is formed from CPVC. In the most preferred embodiment, the CPVC outer layer and inner layer each has a thickness of approximately 0.6 mm. If the composite pipe is intended to be bendable, the inner and outer layer of CPVC should not be greater thickness than about 3.18 mm (0.125"). CPVC which is thicker than about 3.18 mm has a tendency to crack in the radius of the bend. Also, the thickness of the inner layer should not be less than about 0.6 mm as a thickness thinner than about 0.6 mm is too thin to be reliably solvent cemented. If the composite pipe is not intended to be bendable, such as a fire sprinkler pipe using a steel metal layer, the inner and outer layer of CPVC can be thicker than with a bendable pipe. A minimum thickness is still necessary to assure good solvent cementable pipe, as stated above.

Preferably, the multilayer fluid conduit is provided with outer diameters conforming to nominal piping or tubing outer dimensions which can be copper tube sizes (CTS) or iron pipe sizes (IPS), such as, for example, Schedule 40 and/or 80 as defined in ASTM F438 or SDR 11 or defined in ASTM D2846 or other ASTM standards or DIN 8063, and 8079 standards and/or BS 7291 standards. This is preferred so that fittings can be used in a multilayer fluid conduit system of the exemplary embodiment. Pipe and tubing are normally sized by specified outer diameters. The fittings, with which they are used, are sized internally in relation to the standard outer diameters specified for the pipes to be received in the fittings. The only limitation in size of the multilayer composite pipe is the ability to bend the pipe, if such a bend is desired. That means that the diameter of the composite pipe cannot be so large that the composite pipe structure cannot be bent. A schematic example of a bent pipe of an exemplary embodiment is shown in FIG. 2A. However, all the layers should be sufficiently thick to provide the strength and rigidity needed for a safe, leak proof system for the intended uses of composite pipe in a fluid conduit system, whether the fluid is a gas or a liquid, or a slurry.

An exemplary embodiment comprises a multilayer composite pipe in which the inner layer 2 forming the hollow conduit is comprised of CPVC. The metallic intermediate layer 3 is aluminum foil, and the outer layer 4 is also CPVC. The thickness of the aluminum layer is equal to about 1 to about 5 percent of the outer diameter of the multilayer composite pipe. The chart listed below illustrates the various pipe sizes. The measurement of the layers as well as the total measurement are listed in mm. The pipe sizes are based on the DIN 8079 Standard.

| Pipe Size (diameter) | CPVC inner layer thickness | Aluminum layer thickness | CPVC outer layer thickness | Total wall thickness |
|---|---|---|---|---|
| 16 | 0.6 | .04 | .06 | 1.6 |
| 20 | 0.6 | 0.4 | 0.6 | 1.6 |
| 25 | 0.6 | 0.4 | 0.6 | 1.6 |
| 32 | 0.6-1.0 | 0.4-0.8 | 0.6-1.0 | 1.6-2.8 |
| 40 | 0.6-1.0 | 0.4-0.8 | 0.6-1.0 | 1.6-2.8 |
| 50 | 0.6-1.5 | 0.4-0.8 | 0.6-1.0 | 1.6-3.3 |
| 63 | 0.6-1.5 | 0.4-0.8 | 0.6-1.0 | 1.6-3.3 |

Most preferably, the aluminum layer is 1.5% of the outer diameter of the pipe. The ratio of the thickness of either CPVC layer to the thickness of aluminum in the pipe is 1:5 to 3:1. Most preferably, the ratio of the thickness of the CPVC to the thickness of aluminum in the preferred multilayer composite pipe is 3:2. The adhesive used in this exemplary embodiment on both sides of the metallic intermediate layer is an adhesive compatible with CPVC, such as CIRE-10B, available from Mercural Corp., as described above in further detail.

For fire sprinkler applications, the network of pipes are in flow communication with a plurality of fire sprinkler heads. Furthermore, pipes in the piping system 10 may be larger than those that typically correspond to fire sprinkler systems. For instance, the pipes in the piping system 10 may be utilized in DWV applications, residential and commercial hot and cold water plumbing applications, and industrial applications. Pipes in the piping system 10 may have a diameter of from 0.5 inch to twenty-four inches, with from 2 to 8 inches being the most common size diameters.

Figure 5:
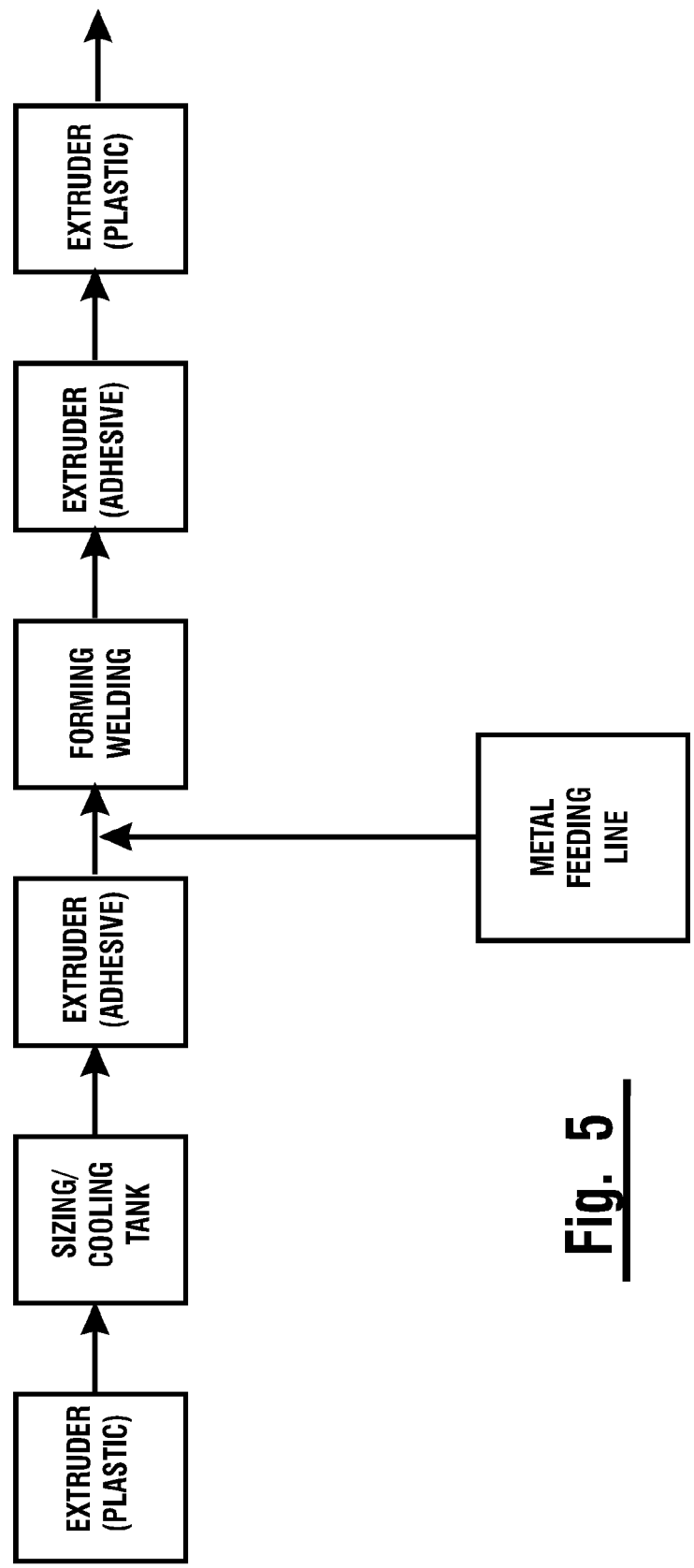
FIG. 5 is a schematic view of one possible embodiment to manufacture the multilayer composite pipe.

FIG. 5 depicts in block form the exemplary steps of one method for fabricating the multilayer composite pipe. Machines that perform these steps are commercially available from Nexane Deutschland GmbH.

Referring to FIG. 5, there is diagrammatically illustrated the preferred process for making the multilayer composite pipe 12 using CPVC and a metal inner layer.

Except for the step of trimming the edges of an adhesive-coated metal strip, coated on both sides, which step may be undertaken independently of the other processing steps, provided the strip is trimmed just prior to feeding it to a metal forming and welding step, the process steps are sequential, and are as follows:

Extruding the inner layer of CPVC:

Powder or pellets of CPVC composition are fed from a hopper into a twin screw extruder operating at a temperature in the range from 138° C. to 216° C. (280° F. to 420° F.) to produce an extrudate having the desired thickness and outside diameter.

Cooling the inner layer of CPVC.

The hot inner layer is vacuum sized in a sizing die and sleeve to control the outside diameter of the inner layer within the desired limits, and extruding through a pipe die to produce a thin walled pipe. The sized inner layer is then cooled to a temperature in the range from 21° C. to 37.74° C. (70° F. to 100° F.). Preferably, the cooled inner layer is drawn through a dancing roll to control the diameter and thickness before the inner layer is fed to a metal forming and welding machine.

Feeding the metal strip to a trimmer.

The edges of the metal strip, coated on both sides with an adhesive, preferably a bilayer adhesive which is dried to form a thin dry layer having a thickness in the range from 10 to 50 micrometers, are freshly trimmed to the desired width. The trimming of the metal sheet is for the purpose of removing any oxidized metal from the edges, which are to be welded together. Thus, the trimming step should occur within 10 minutes, preferably no longer than 1 minute, before being formed around the inner layer of CPVC. Oxidation at the edges can result in poor welds.

Forming and welding the metal strip to form the intermediate metal layer.

The trimmed metal strip is fed immediately beneath the inner layer conduit of CPVC as it enters the forming and welding machine. The metal strip is formed around the inner layer of CPVC so that the trimmed edges provide a gap, about 0.25 mm (0.010 inch), small enough to allow a laser of appropriate intensity to continuously butt-weld the metal strip longitudinally, so as to form a completely closed metal layer around the inner layer of CPVC. The intensity of the laser is chosen so as not to damage the polymer of the inner layer by overheating the inner layer of CPVC, yet provide a weld that completely penetrates the metal thickness.

Compacting the composite of the inner layer of CPVC and the intermediate metal layer.

To insure that the outside diameter of the composite of the inner layer of CPVC and the intermediate metal layer is maintained within the desired tolerance, it is circumferentially compacted between each of a succession of oppositely disposed grooved rollers.

Heating the compacted composite of the inner layer of CPVC and the intermediate metal layer.

The compacted composite of the inner layer of CPVC and the intermediate metal layer is heated in an inductance heater to a temperature in the range from about 149° C. to 171° C. (300° F. to 340° F.) to activate the adhesive and to preheat the metal surface to a temperature at which the metal is to be coated with the outer layer of CPVC.

Extruding the outer layer of CPVC.

The heated composite of the inner layer of CPVC and the intermediate metal layer is fed into the sealed antechamber of a crosshead die where vacuum is exerted just prior to having the outer layer of CPVC extruded onto the heated adhesive-coated metal. A vacuum in the range of from 31-56 cm (12 to 22 inches) of mercury, creates a negative pressure around the metal layer so that the CPVC extruded onto it is forcefully sucked onto the adhesive-coated metal, ensuring activation of the adhesive and a cohesive bond when the CPVC coats the adhesive at a temperature in the range from 149° C. to 232° C. (300° F. to 450° F.). The die ensures that the thickness of the outer layer of CPVC is controlled within the desired range.

Cooling the completed composite pipe.

The hot composite pipe from the crosshead die is cooled in a cooling water tank to room temperature before it is either cut into lengths or rolled into coils of pipe. The steps described above represent the preferred method to make the composite pipe. Other methods could be used as well as variations to the steps described in the preferred method.

Alternatively in some embodiments, a preformed rigid thermoplastic pipe can be coated with an adhesive. A metallic intermediate layer can be placed on the adhesive coated layer. A second layer of adhesive is then applied to the outer side of the metallic intermediate layer. An outer layer can then be extruded on top of the metallic intermediate layer. Optionally, the second adhesive layer, as well as, the thermoplastic layer can be coextruded in a single step using a coextrusion die.

Figure 3A:
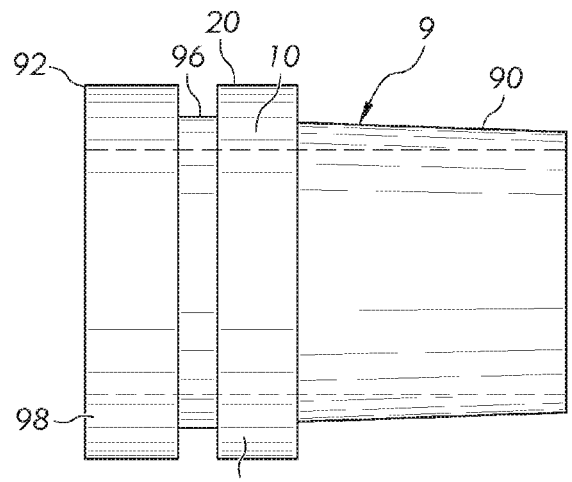
FIGS. 3A, 3B, and 3C are schematic views of the insert coupling bushing of the fluid handling assembly that is used to help join the multilayer composite pipes.
Figure 3B:
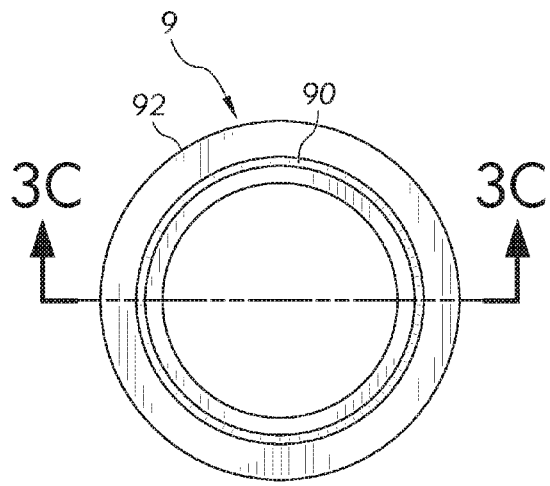
Figure 3C:
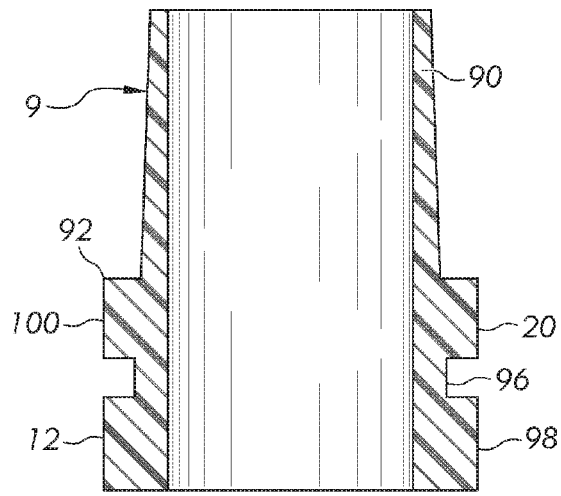

In an exemplary embodiment, pipe lengths 12a, 12b may be joined together by respective coupling bushings 9a and 9b and a mechanical fixture as shown in FIG. 6. FIGS. 3A, 3B and 3C illustrate the coupling bushing 9 which is used to join the multilayer composite pipes 12a and 12b. The coupling bushing 9a for pipe 12a is of similar construction as the coupling bushing 9b for pipe 12b. So, in the interest of brevity, the coupling bushing for pipe 12a will be described. The exemplary coupling bushing (shown in FIGS. 3C and 4A) 9 comprises an open ended, hollow cylindrical body 90 with a radially extending flange 92 which radiates outwardly from the end of the body 90. The body 90 is tapered, so that it does not scrape or cause any occlusions in the cement as it is inserted into the pipe 12a. The inward taper of body 90 is in the range from 0.4° to 4.0° to the horizontal line at the point where body 90 meets flange 92. A continuous annular groove 96 is formed in the flange 92 at the axial midpoint between the respective ends of the flange 92 dividing the flange axially into equal first and second sections 98, 100. The groove 96 circumscribes the outer surface of the flange and in an exemplary embodiment for a fitting used with pipes having a nominal diameter of 2 inches extends a distance of 0.063 inch depth into the flange 92. The depth of groove 96 can be from about 0.060 inch to about 0.2 inch. The depth of groove 96 should not be more than about 60% of the thickness of flange 92. The outer diameter of the inner hollow body 90 of the coupling bushing 9 should be less than the inner diameter of the multilayer composite pipe 12a, provided, however, that the difference in the outer diameter of the pipe 12a and the inner diameter of the pipe 12a does not exceed that suggested in ASTM D2846. The exemplary flange 92 is configured to have the same outer diameter as the multilayer composite pipe 12a. The body 90 of the exemplary coupling bushing 9 is inserted into the multilayer composite pipe 12a until the second section 100 of the flange 92 abuts the edge of the open end of the pipe 12a. An adhesive (not shown) can be used to permanently bond the inner surface 2 of the multilayer composite pipe 12a to the outer surface of the hollow cylindrical body 90 of the coupling bushing 9. Preferably, this coupling bushing 9 is made from the same material as the inner hollow conduit 2 of composite pipe 12a. The flange 92 of the exemplary coupling bushing 9 for a size of 2 inches nominal diameter pipe has a thickness of 0.295 inches in the axial direction.

The width of the continuous annular groove 96 in the second portion of coupling bushing 9 will vary depending on the diameter of the pipe that one desires to connect. Preferred width of the continuous annular groove 96 is about 7.95 mm (0.313 inch) for nominal pipe diameters of from 0.75 inch to 90 mm (3.5 inches). For nominal pipe diameters of from 100 mm (4 inches) to 150 mm (6 inches), the width of the continuous annular groove 96 is about 9.53 mm (0.375 inch). The preferred width of the continuous annular groove 96 is about 11.13 mm (0.438 inch) for nominal pipe diameters of 200 mm (8 inches) and about 12.70 mm (0.5 inches) for 250 mm (10 inches) to 500 mm (20 inches) nominal pipe diameters. For 550 mm (22 inches) to 600 mm (24 inches), the width of the continuous annular groove 96 is about 14.30 mm (0.563 inch). The width of continuous annular groove 96 is from about 7.95 mm (0.313 inch) to about 14.30 mm (0.563 inch).

The total length of the coupling bushing 9, including the first and second portion is preferably about 3 inches in length for nominal pipe diameters up to 2 inches in diameter. For nominal pipe diameters greater than 2 inches, the total length of coupling bushings 9 is preferably about 1 inch longer than the nominal diameter of the pipe. Therefore, the total length of coupling bushing 9 can be from about 3 inches to 25 inches.

The preferred adhesive to bond the inner surface 2 of the multilayer composite pipe 12a to the outer surface of the hollow cylindrical body 90 of the coupling bushing 9 is a CPVC solvent cement. The CPVC solvent cement can be sprayed, brushed or applied in any manner to the outer surface of the hollow cylindrical body 90 of the coupling bushing 9 and/or to the inner surface of the hollow conduit 2 of composite pipe 12a in the area where hollow cylindrical body 90 connects with hollow conduit 2. The coupling bushing 9 is then inserted into the composite pipe 12a until the end of the composite pipe 12a abuts the flange 92 of coupling bushing 9. The coupling bushing 9 is then preferably rotated about 90° to evenly spread the solvent cement. Examples of suitable CPVC solvent cements are commercially available from IPS, Oatey, Verhagen, and Henkel. CPVC solvent cements are normally made by dissolving CPVC resin in a solvent or blend of solvents and usually have a concentration of CPVC resin of from about 15% to about 25% by weight of CPVC resin. The CPVC solvent cements can also have various other ingredients, such as silica thicksotropic agents, colorants, and various additives.

As illustrated in FIG. 6, in this exemplary embodiment, a first type of mechanical fixture or coupling device 16 sealingly engages each of the coupling bushings in attached relation with pipes 12a and 12b in a close end to end relationship. The use of the exemplary coupling device 16 eliminates the need for solvent cement to join the coupling bushings to each other.

Figure 9:
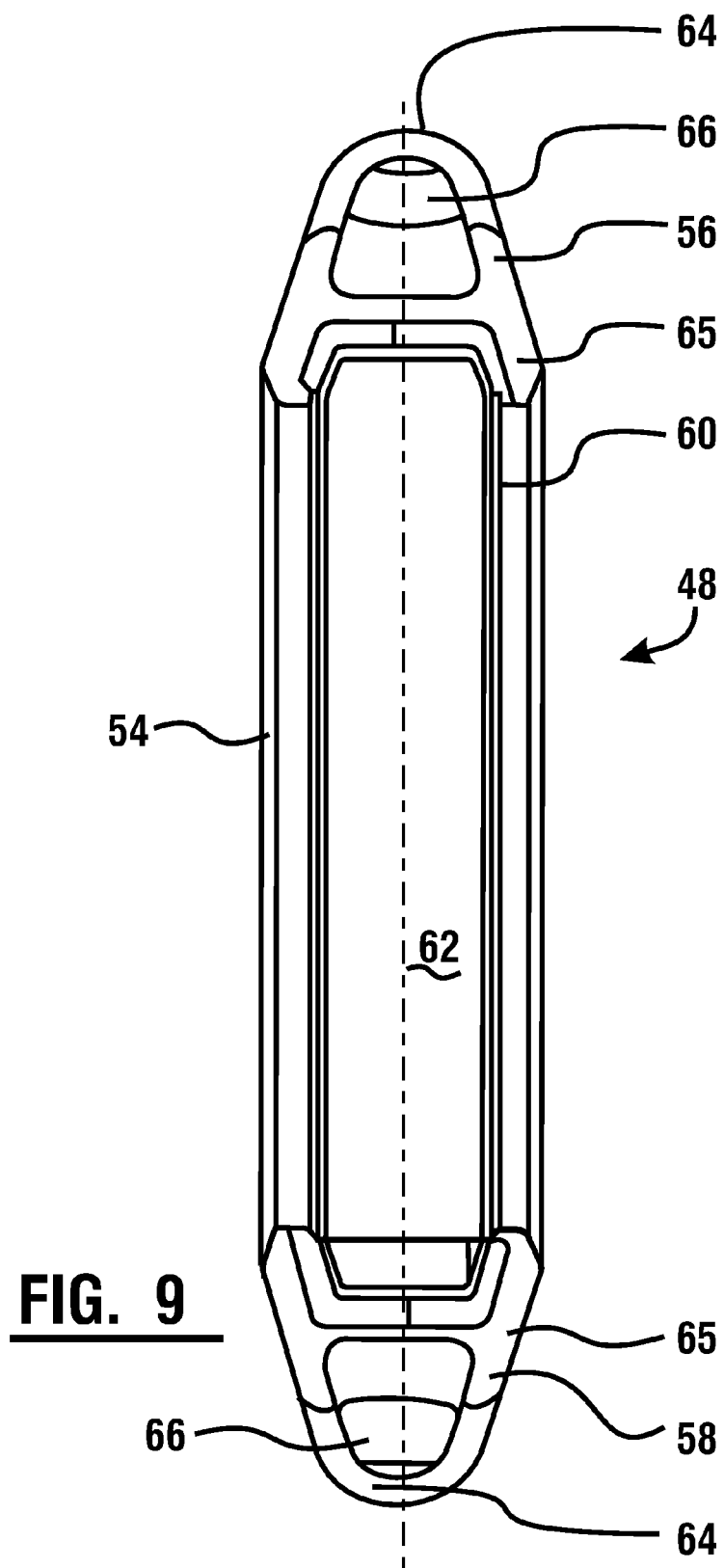
FIG. 9 is a bottom view of a coupling segment of a coupling device.

As shown in FIG. 6, each coupling bushing 9 includes an annular sealing surface portion disposed between the groove 96 and end. As best shown in FIGS. 8 and 9, exemplary coupling device 16 includes an annular resilient sealing member 46 that in the operative position sealingly engages the annular sealing surface portions 40, 42. The material from which seal 46 is formed is preferably compatible with the CPVC composition to avoid degradation or the formation of stress cracks in the pipe. Unplasticized EPDM rubber is the preferred material of sealing member 46. In an exemplary embodiment, sealing member 46 may include a bifurcated internal sealing surface 47.

With reference to FIGS. 8 and 9, in this exemplary embodiment, coupling device 16 includes a pair of coupling segments 48, 50 that may be of substantially identical construction. Therefore, for simplicity, only the construction of segment 48 will be described in detail. Coupling segment 48 comprises an arcuate body 54 having a first end 56, a second end 58, and an interior concave surface 60 extending between the first end and the second end. A longitudinal channel 62 extends along the concave surface 60 from first end 56 to second end 58. The longitudinal channel 62 is designed to receive the sealing member 46. In this exemplary embodiment, a flange 64 extends from each end 56, 58 and each flange has a fastener hole 66 therethrough.

When the coupling device 16 is in an assembled condition, the first and second ends of one of the coupling segments are presented to the respective first and second ends of the other coupling segment. Seal 46 is engaged in an interior circumferential region 70 which includes the longitudinal channels 62 and which is bounded by the interior concave surfaces 60 (shown in FIG. 6). In this exemplary embodiment, a pair of mechanical fasteners 72 are utilized to connect the pair of coupling segments. Each flange 64 includes a generally planar surface 65 adapted to abut a corresponding surface on the other coupling segment. The engagement of these surfaces provides a means to limit compression forces exerted on the coupling bushings 9a and 9b. In the exemplary embodiment, the arcuate body 54 is generally manufactured from ductile iron, although in other embodiments other materials may be used.

When assembled, the exemplary coupling device and the pair of coupling bushings 9 comprise a first pipe fitting assembly that is operative to pass one or more testing protocols as will be described in greater detail below.

An exemplary method includes forming a system of pipe lengths 12 in fluid flow communication, wherein the pipe lengths are formed of a CPVC composition. In forming the system, at least one pair of pipe lengths 12a, 12b is sealingly engaged in close end-to-end relationship without the use of solvent cement to permanently hold the pipe lengths together using an intermediate coupling. Instead, the at least one pair of pipe lengths is reversibly and releasably sealingly engaged with a first type of mechanical fixture or coupling device 16.

An exemplary method includes subjecting a first pipe fitting assembly comprising the pair of pipe lengths and the coupling device to a testing protocol.

In an exemplary method, the step of sealingly engaging the pair of pipe lengths 12a, 12b includes forming coupling bushings 9a, 9b with the continuous annular groove 96 a predetermined longitudinal distance from an end thereof. A resilient annular seal 46, formed of a material chemically compatible with the CPVC pipe, is positioned onto sealing surfaces 40, 42 located between each respective groove and coupling bushing end. Thereafter, a pair of coupling segments is positioned about the annular seal such that the seal is seated in an interior longitudinal channel 62 of each coupling segment which forms the interior circumferential region 70.

Testing for Mechanical Connectors:

One objective of the exemplary embodiments disclosed herein is that the pipe and mechanical fixture assembly will be able to meet or exceed testing requirements for use in piping systems, including UL testing requirements for fire sprinkler systems. A few of the tests to which the pipe fitting assemblies would be subjected are briefly described below.

Fire Exposure Test (UL 1821, Sec 13)

Representative pipe and fitting assemblies for ceiling pendent, upright, and sidewall pendent shall be tested.

Exposed pipe and fitting assemblies:
a) shall not burn, separate, or leak; and
b) shall maintain the sprinkler in the intended operating position.

Following the fire exposure, the pipe and fitting assemblies shall withstand an internal hydrostatic pressure equal to the maximum rated pressure for 5 minutes without rupture or leaks.

Bending Moment Tests (UL 213, Sec. 12):

Testing will be conducted with all sizes of tees and crosses which include a threaded outlet connection except ½ and ¾ in. outlets.

The fitting and pipe joint assembly shall not leak or rupture when subjected to the specified bending moment. During the tests the assembly is to be pressurized to rated pressure.

The required bending moment is calculated based on twice the weight of water filled pipe over twice the maximum distance between pipe supports specified in the Standard for Installation of Sprinkler Systems, ANSI/NFPA 13.

| CPVC Bending Moments | | | |
|---|---|---|---|
| Pipe Size | H2O filled (lbs/ft) | Hanger (feet) | Moment (ft-lbs) |
| 1" | 0.675 | 6 | 24.3 |
| 1¼" | 1.079 | 6.5 | 45.6 |
| 1½" | 1.417 | 7 | 69.6 |
| 2" | 2.224 | 8 | 142.3 |
| 2½" | 3.255 | 9 | 263.7 |
| 3 | 4.829 | 10 | 482.9 |

With the assembly support at point located at least 12 inches (305 mm) on either side of the center of the coupling, a gradually increasing force is to be applied to the center of the coupling until the required bending moment is achieved.

Vibration Test (UL 1821, Sec. 19)

Testing will be conducted with 2×1 threaded outlet and 2×1¼ inch grooved outlet tees and 2½×1 threaded outlet, 2½×1¼ grooved outlet, 3×1½ inch threaded and grooved crosses. The 2½ inch cross will have a 1 inch threaded outlet on one side and a 1¼ inch grooved outlet on the other side. The 3 inch cross will have a 1½ inch threaded outlet on one side and a 1½ inch grooved outlet on the other side.

Pipe and fitting assemblies shall withstand the effects of vibration for 30 hours without deterioration of performance characteristics. Following the vibration test, each test assembly shall comply with the specified requirements in the Hydrostatic Pressure Test.

Assembly Test (UL 1821, Sec. 22)

Testing will be conducted with all combinations of pipe size and hole size for both tees and crosses.

Samples shall withstand for 2 hours, without rupture, separation, or leakage, an internal hydrostatic pressure equivalent to the rated pressure or higher, as specified in the installation and design manual, and other internal hydrostatic pressures as they relate to cure times specified in the installation and design manual.

Hydrostatic Pressure Test (UL 1821, Sec. 23)

Testing will be conducted with all combinations of pipe size and hole size for both tees and crosses.

Representative pipe and fitting assemblies shall withstand for 1 minute, without rupture, separation, or leakage, an internal hydrostatic pressure of five times the rated pressure.

Pressure Cycling Test (UL 1821, Sec. 24)

Testing will be conducted with all combinations of pipe size and hole size for both tees and crosses.

Representative pipe and fitting assemblies shall withstand without leakage, separation, or rupture 3000 pressure cycles from zero to twice the rated pressure of the pipe and fittings. After the cycling, the pipe and fitting assemblies shall comply with the Hydrostatic Pressure Test.

Temperature Cycling Test (UL 1821, Sec. 25)

Testing will be conducted with all combinations of pipe size and hole size for both tees and crosses.

Representative pipe and fitting assemblies shall comply with the Hydrostatic Pressure Test after being subjected to temperature cycling from 35° F. (1.7° C.) to the maximum rated temperature. The pipe and fitting assemblies are to be filled with water, vented of air, hydrostatically pressurized to 50 psig (345 kPa), and subjected to temperature cycles of 35° F. (1.7° C.) to the maximum rated temperature to 35° F. Each assembly is to be held at each temperature specified for a period of 24 hours. A total of 5 complete cycles are to be completed.

Long Term Hydrostatic Pressure Test (UL 1821, Sec. 27)

Testing will be conducted with all combinations of pipe size and hole size for both tees and crosses.

The pipe and fitting assemblies shall withstand without rupture, leakage, or joint separation the hoop stress specified below, applied to the assembly for 1000 hours, at the maximum rated temperature:

| Type | Standard dimension ratio | Required hoop stress, psi (Mpa) |
|---|---|---|
| CPVC | 13.5 | 2310 (15.93) |

During and after exposure, the pipe and fitting assemblies are to be examined for evidence of rupture, leakage, or joint separation.

Surface Burning Characteristics Test (UL 723/ASTM E 84 (NFPA 255 and UBC 8-1))

Representative pipe and fitting assemblies for utilization in a water distribution system will be tested.

This fire-test-response standard for the comparative surface burning behavior of building materials is applicable to exposed surfaces such as walls and ceilings. The test is conducted with the specimen in the ceiling position with the surface to be evaluated exposed face down to the ignition source. The material, product, or assembly can be capable of being mounted in the test position during the test. Thus, the specimen can either be self-supporting by its own structural quality, held in place by added supports along the test surface, or secured from the back side.

The purpose of this test method is to determine the relative burning behavior of the material by observing the flame spread along the specimen. Flame spread and smoke developed index are reported. However, there is not necessarily a relationship between these two measurements.

In a particular test, FLOWGUARD® CPVC pipes and fittings as described herein meet the 25/50 flame spread/smoke developed requirement and are suitable for installation in plenums. Specifically, the pipes and fittings described herein can have a flame spread index of 5 and a smoke developed index of 35 when ½" water-filled pipe and corresponding fittings are employed in the fluid handling assembly. In another example, the pipes and fittings described herein can have a flame spread index of 0 and a smoke developed index of 20 when 2" water-filled pipe and corresponding fittings are employed in the fluid handling assembly. In yet another example, the pipes and fittings described herein can have a flame spread index of 0 and a smoke developed index of 5 when empty ½" pipe and corresponding fittings are employed in the fluid handling assembly. In still yet another example, the pipes and fittings described herein can have a flame spread index of 5 and a smoke developed index of 25 when empty 2" pipe and corresponding fittings are employed in the fluid handling assembly in the fluid handling assembly.

In another test, CORZAN® CPVC pipes and fittings as described herein meet the 25/50 flame spread/smoke developed requirement and are suitable for installation in plenums. For example, the pipes and fittings described herein can have a flame spread index of 0 and a smoke developed index of 20 when ½" water-filled pipe and corresponding fittings are employed in the fluid handling assembly. In another example, the pipes and fittings described herein can have a flame spread index of 0 and a smoke developed index of 15 when 6" water-filled pipe and corresponding fittings are employed in the fluid handling assembly.

Thus, the exemplary apparatus and processes for forming the above-mentioned fluid handling assembly achieves one or more of the above stated objectives.

The fluid handling system described herein is intended to be able to operate at pressures up to about 125 psig. Normal fluid pressures are from about 50 to about 100 psig. In DWV systems, sometimes the system can be operated under vacuum conditions. The present fluid handling system is able to operate under pressure or vacuum without leaking.

As used herein, the term CPVC pipe means that the pipe consists of at least 50% by weight of CPVC polymer, and preferably 70% by weight CPVC polymer. Other materials are often added together with CPVC resin to make a CPVC composition. The other materials can include other polymeric materials such as impact modifiers, flow aids and the like. The other materials can also include stabilizers, fillers, colorants, antioxidants, and the like, as is well understood in the art. Likewise, other thermoplastic pipe will be at least 50% by weight of the polymer designating the plastic pipe. That is, PVC pipe will be at least 50% by weight PVC polymer, and ABS pipe will be at least 50% by weight ABS polymer, and so on. The thermoplastic pipes of the fluid handling system of this invention are rigid pipes and thus softening plasticizers should be held to a very low level and preferably not used as at levels greater than about 5 weight % they render the pipe more flexible and lower the physical properties.

The preferred embodiments described above relate to connecting lengths of CPVC composite pipes together by using the coupling bushing and a mechanical fixture to create a releasable connection. The unique coupling bushing is of particular utility if one wishes to connect composite pipes using a mechanical fixture to create a releasable connection, because the composite pipes are not suitable to have a groove formed in the pipe, by either cutting or rolling a groove.

The coupling bushing 9 is preferably made from the same polymeric material (not necessarily the same composition) as the innermost layer of the pipe one desires to connect. This is necessary to insure the optimum bond using solvent cement. The coupling bushing 9 is preferably produced by injection molding process using a suitable injection molding composition of the same polymer type as the innermost layer of the pipe one desires to connect.

The unique coupling bushing 9 can also be used to connect different types of thermoplastic pipes together using a mechanical fixture. The coupling bushing 9 can also be used to connect thermoplastic pipe to metal pipe using a mechanical fixture.

In one embodiment for connecting different types of thermoplastic pipes would be connecting a first length of CPVC pipe with a second length of PVC pipe in a fluid handling system. The CPVC pipe which could be a CPVC composite pipe as described above or a standard non-composite CPVC pipe would have a coupling bushing 9, made from a CPVC composition, solvent cemented into the end of the CPVC pipe. The PVC pipe, which could be PVC composite pipe or a standard non-composite PVC pipe, would have a coupling bushing, made from a PVC composition, solvent cemented into the end of the PVC pipe. A mechanical fixture, as shown in FIGS. 8 and 9, could then be used to secure the CPVC coupling bushing and the PVC coupling bushing in abutting relationship. The coupled pipe system is reversible by use of the mechanical fixture.

In another embodiment a first length of CPVC pipe could be connected to a second length of metal pipe. The metal pipe could have a groove rolled into the pipe. The CPVC pipe could have a coupling bushing 9 solvent cemented into the end of the CPVC pipe. A mechanical fixture, as shown in FIGS. 8 and 9, could then be used to secure the CPVC coupling bushing to the metal pipe in abutting relationship. The coupled pipe system is reversible by use of the mechanical fixture.

In another embodiment, a first length of a thermoplastic pipe which is solvent cementable, such as CPVC, PVC, ABS or PVDF could be connected to a second length of a non-solvent cementable thermoplastic pipe, such as polyolefin pipes made from polypropylene or polyethylene. The solvent cementable pipe would have a coupling bushing solvent cemented into the end of the pipe. The coupling bushing is made from the same polymer type as the pipe to facilitate good solvent cement bonding. A coupling bushing of the same polymer type as the non-solvent cementable pipe would also be attached into the end of the non-solvent cementable pipe by heat melt bonding. Non-solvent cementable materials can be connected by heat bonding, such as by embedding wires into the coupling bushing barrel or the pipe and applying electrical resistance heating to melt the connecting surface and allow the two surfaces to melt fuse together. The two dissimilar coupling bushings would then be connected in an abutting relationship by the use of a mechanical fixture as shown in FIGS. 8 and 9. The connection would be reversible by use of the mechanical fixture.

In the foregoing description, certain terms have been used for brevity, clarity and understanding, however, no unnecessary limitations are to be implied therefrom, because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. A fluid handling assembly comprising:
a) a first pipe, the first pipe including:
an inner layer comprising a chlorinated polyvinyl chloride ("CPVC") composition, an intermediate layer comprising a metal at least partially surrounding the inner layer; and an outer layer comprising a CPVC composition at least partially surrounding the intermediate layer; and
b) a first tubular coupling bushing having a first portion and a second portion, the first portion being tapered in a direction away from the second portion and being inserted into the first pipe in engaging relation with said inner layer of said first pipe, wherein the first tubular coupling bushing is coupled to the first pipe by solvent cement, the second portion having a continuous annular groove in an annular exterior wall of the second portion,
(c) a second pipe, the second pipe including an inner layer comprising a CPVC composition, an intermediate layer comprising a metal at least partially surrounding the inner layer; and an outer layer comprising a CPVC composition at least partially surrounding the intermediate layer; and
(d) a second tubular coupling bushing having a first portion and a second portion, wherein the first portion is inserted into the second pipe and in engaging relation with said innerlayer of said second pipe, wherein said second portion of said second tubular coupling bushing has a continuous annular groove in an annular exterior wall of the second portion,
(e) a mechanical fixture which releasibly engages the second portion of the first tubular coupling bushing and the second portion of the second tubular coupling bushing to sealingly engage the first pipe and the second pipe
wherein the first and second tubular coupling bushings comprise a CPVC composition and are in close end to end relationship with each other,
wherein each of the second portions of the first and second tubular coupling bushings include a continuous annular groove formed in a wall of the respective second portion at a predetermined distance from an end of the tubular coupling bushings facing an end of the other the tubular coupling bushing, and wherein a portion of the wall on the respective second portion of said coupling bushing between the end of the tubular coupling bushing and the groove comprises a sealing surface; and
wherein the mechanical fixture includes a coupling device, wherein the coupling device includes a resilient seal, wherein the resilient seal is operative to annularly engage the sealing surfaces and to span the ends of the first and second tubular coupling bushings, wherein the seal comprises a material chemically compatible with the CPVC composition.

2. The fluid handling assembly of claim 1 wherein the first portion of said first tubular coupling bushing extends in inserted relation into the first pipe such that the second portion of said first tubular coupling bushing is in proximity to the first pipe, the second portion of said first tubular coupling bushing having an outer diameter that is generally equal to an outer diameter of the first pipe.

3. The fluid handling assembly of claim 1 wherein the first tubular coupling bushing comprises a CPVC composition.

4. The fluid handling assembly of claim 1 wherein when assembled, the assembly is operative to pass a first predetermined testing protocol, wherein the first predetermined testing protocol includes at least one of a Fire Exposure Test, UL 1821, Sec 13; a Bending Moment Test, UL 213, Sec. 12; a Vibration Test, UL 1821, Sec. 19; an Assembly Test, UL 1821, Sec. 22; a Hydrostatic Pressure Test, UL 1821, Sec. 23; a Pressure Cycling Test, UL 1821, Sec. 24; a Temperature Cycling Test, UL 1821, Sec. 25; a Long Term Hydrostatic Pressure Test, UL 1821, Sec. 27; and combinations thereof.

5. The fluid handling assembly of claim 1 wherein the mechanical fixture includes a coupling device that is operative to sealingly engage the first tubular coupling bushing and the second tubular coupling bushing in close end to end fluid tight relationship without the use of solvent cement.

6. The assembly of claim 1, wherein the mechanical fixture includes a pair of coupling segments, wherein each coupling segment includes an arcuate body having a first end, a second end, an interior concave surface extending between the first end and the second end, and a longitudinal channel extending along the concave surface; and
at least one mechanical fastener operative to detachably connect the pair of coupling segments;
wherein when the coupling device is assembled, the resilient annular seal extends within the longitudinal channel of each coupling segment.

* * * * *